(12) United States Patent
George et al.

(10) Patent No.: US 9,470,527 B2
(45) Date of Patent: Oct. 18, 2016

(54) ACCELEROMETERS

(71) Applicant: THE SECRETARY OF STATE FOR DEFENCE, London (GB)

(72) Inventors: David George, Reading (GB); Edward Davies, London (GB); Malcolm Gower, London (GB); Werner Karl, London (GB); Andrew Holmes, London (GB)

(73) Assignee: The Secretary of State for Defence, London (GB)

( * ) Notice: Subject to any disclaimer, the term of this patent is extended or adjusted under 35 U.S.C. 154(b) by 152 days.

(21) Appl. No.: 14/371,225

(22) PCT Filed: Jan. 11, 2013

(86) PCT No.: PCT/GB2013/000012
§ 371 (c)(1),
(2) Date: Jul. 9, 2014

(87) PCT Pub. No.: WO2013/104890
PCT Pub. Date: Jul. 18, 2013

(65) Prior Publication Data
US 2014/0352432 A1   Dec. 4, 2014

(30) Foreign Application Priority Data
Jan. 13, 2012 (GB) .................................. 1200521.1

(51) Int. Cl.
*G01C 19/56* (2012.01)
*G01C 19/5642* (2012.01)
*G01P 15/08* (2006.01)
(Continued)

(52) U.S. Cl.
CPC ....... *G01C 19/5642* (2013.01); *G01P 15/0802* (2013.01); *G01P 15/093* (2013.01); *G01P 15/125* (2013.01); *G01C 19/56* (2013.01); *G01C 19/5607* (2013.01); *G01C 19/5649* (2013.01);
(Continued)

(58) Field of Classification Search
CPC .................................................... G01C 19/57
USPC ...................................................... 73/504.12
See application file for complete search history.

(56) References Cited

U.S. PATENT DOCUMENTS 6,309,077 B1   10/2001   Saif et al.
6,401,536 B1 *  6/2002   O'Brien ............. G01P 15/125
                                                      73/514.11
(Continued)

FOREIGN PATENT DOCUMENTS

CN   102128953   *   7/2011  .............. B81B 3/00
CN   102128953 A       7/2011
(Continued)

OTHER PUBLICATIONS

International Searching Authority, Written Opinion of the ISA' PCT/GB2013/000012, Nov. 1, 2013, pp. 1-3.*
(Continued)

*Primary Examiner* — David Gray
*Assistant Examiner* — Kevin Butler
(74) *Attorney, Agent, or Firm* — Dean W. Russell; Kilpatrick Townsend & Stockton LLP

(57) ABSTRACT

The invention provides for an accelerometer comprising a proof mass within a fixed substrate wherein the proof mass is connected to the substrate by one or more v-beams. Acceleration is determined by measuring the deflection of the v-beam or beams.

13 Claims, 2 Drawing Sheets

(51) Int. Cl.
*G01P 15/093* (2006.01)
*G01P 15/125* (2006.01)
*G01C 19/5607* (2012.01)
*G01C 19/5719* (2012.01)
*G01C 19/5649* (2012.01)

(52) U.S. Cl.
CPC ... *G01C 19/5719* (2013.01); *G01P 2015/0814* (2013.01)

(56) References Cited

U.S. PATENT DOCUMENTS

| | | | |
|---|---|---|---|
| 6,947,200 B2* | 9/2005 | Huibers | G02B 26/0833 359/224.1 |
| 7,137,299 B2* | 11/2006 | Meyer | G01P 15/093 250/227.14 |
| 2002/0092352 A1* | 7/2002 | Foote | B81B 3/0051 73/514.21 |
| 2002/0178817 A1* | 12/2002 | Selvakumar | G01P 15/0802 73/514.32 |
| 2004/0237648 A1* | 12/2004 | Jones | G01H 9/004 73/514.26 |
| 2005/0157305 A1* | 7/2005 | Yu | G01D 5/35303 356/480 |
| 2008/0163686 A1* | 7/2008 | Carr | G01L 9/0079 73/514.26 |
| 2008/0289429 A1* | 11/2008 | Zhou | G01P 15/093 73/653 |
| 2009/0114031 A1* | 5/2009 | Maguire | G01P 15/08 73/760 |
| 2012/0116709 A1* | 5/2012 | Martin | G01P 15/093 702/141 |
| 2014/0352432 A1* | 12/2014 | George | G01P 15/0802 73/504.12 |

FOREIGN PATENT DOCUMENTS

| | | | | |
|---|---|---|---|---|
| EP | 2292462 | * | 8/1995 | ............ G01P 15/125 |
| EP | 1245960 | * | 10/2002 | ............ G01P 15/097 |
| EP | 1245960 A2 | | 10/2002 | |
| GB | 2292462 A | | 2/1996 | |
| GB | 2444373 A | | 6/2008 | |
| WO | 0257799 A2 | | 7/2002 | |
| WO | 2008156018 A1 | | 12/2008 | |

OTHER PUBLICATIONS

Davies, Edward, 'Optical Accelerometer with Mechanical Amplification via a V-Beam Mechanism', IEEE, Jan. 20-24, 2013.*
International Application No. PCT/GB2013/000012, International Search Report mailed May 7, 2013, 3 pages.
Combined Search and Examination Report dated Feb. 28, 2013 in related Application No. GB1300511.1.
Search Report dated May 10, 2012 in priority Application No. GB1200521.1.
International Preliminary Report on Patentability dated Jul. 15, 2014 in Application No. PCT/GB2013/000012.
Chinese Patent Application No. 201380013993.X, Office Action mailed Sep. 6, 2015, 7 pages.
Chinese Patent Application No. 201380013993.X, Office Action mailed Jun. 21, 2016, 4 pages.
Japanese Patent Application No. 2014-551670, Office Action mailed Jul. 5, 2016, 4 pages.

* cited by examiner

ACCELEROMETERS

CROSS REFERENCE TO RELATED APPLICATIONS

This application is the U.S. national phase of International Application No. PCT/GB2013/000012 filed on Jan. 11, 2013, and published in English on Jul. 18, 2013 as International Publication No. WO 2013/104890 A1, which application claims priority to Great Britain Patent Application No. 1200521.1 filed on Jan. 13, 2012, the contents of both of which are incorporated herein by reference.

FIELD OF THE INVENTION

This invention relates to accelerometers and the like.

BACKGROUND OF THE INVENTION

An accelerometer typically employs a damped proof mass on a spring. Under the influence of external accelerations a proof mass deflects from its neutral position. This deflection is measured and from it the acceleration is calculated. Commonly, the capacitance between a set of fixed electrodes and a set of electrodes attached to the proof mass is measured. This method is simple, reliable, and inexpensive.

Modern accelerometers are often small micro electromechanical systems (MEMS), and consist of little more than a cantilever beam with a proof mass (also known as seismic mass). Damping results from the residual gas sealed in the device. A common way to make such devices is to etch the components from a single silicon block. As the proof mass moves, the displacement between this proof: mass and the base of the cantilever beam on which it is suspended is measured.

Because they are inexpensive and small, MEMS accelerometers are often used as components in many modern devices. Solid state accelerometers are found in many current smart phones, for example, so that the phone software can detect its orientation and rotate the display accordingly.

SUMMARY OF THE INVENTION

The sensitivity of such devices is limited however, and it would be advantageous to create a MEMS type device with an increased, sensitivity. Accordingly the invention provides for an accelerometer comprising a proof mass within a fixed substrate Wherein the proof mass is connected to the substrate by one or more V-beams, acceleration of the substrate being determined by measuring deflection of the V-beam or beams.

Such an arrangement leads to an amplification of the deflection thereby heightening the device sensitivity to acceleration.

As the proof mass moves with respect to the fixed substrate, the v beam deflects, either by bowing or bending in the middle and this deflection is picked up by a detector. Since geometrically, the deflection of the V-beam is greater than the movement of the proof mass, there is built in to the accelerometer an amplification rendering it more sensitive.

Detection might be via detecting variations in capacitance or by electro optical detection. Where the detection method is optical, it is possible to put an optically reflective coating at the apex of the V beam to enhance sensitivity, such as gold or another suitably reflective metal. This forms one mirror of a Fabry Perot interferometer which can be used to measure the deflection.

If one v beam is used, the Fabry Perot cavity may be formed by reflection from the V-beam mirror and the end of the optical fibre interrogating the device. The V-beam need not be articulated. A straight or bowed beam can be used as long as it deflects in the proper direction in a predictable manner.

The Fabry-Perot cavity may be formed between the opposing sidewalls of two adjacent silicon blocks. Silicon is optically transmissive at optical wavelengths beyond 1.13 µm, so by choosing an appropriate wavelength in the infrared region, 1.55 µm for example, the cavity can be illuminated by light entering through one of the blocks. Unwanted additional reflections from the outer sidewalls of the blocks can be avoided by making the blocks wedge-shaped rather than rectangular.

Illumination could be delivered via a single mode optical fibre, although multimode fibres could also be used. The light output from the cavity may be collected by the same optical fibre (reflection mode), or by a second optical fibre on the opposite side of the cavity (transmission mode). The optical fibre(s) may be lensed so as to collimate the light. Collimation produces a higher finesse cavity while also ensuring maximum coupling of light into the output optical fibre for sensing. If the mirror blocks are wedge-shaped, the input fibre should be mounted obliquely so that an axial ray emerging from the fibre is refracted to lie along the axis of the cavity on entering the first block.

For the design with a single V-beam, the Fabry-Perot cavity may alternatively be formed between the mirror on the V-beam and the end facet of the optical fibre.

For all variants of the accelerometer, the mirror surfaces may be coated with a thin metal layer to achieve higher reflectivity and hence cavity finesse. Highly reflective thin film coatings or distributed Bragg reflectors may also be used. Additionally, the input and output fibre end facets may be anti-reflection coated to avoid unwanted reflections from these surfaces.

It should be noted that while the device described here is an optical accelerometer, the method of mechanical amplification described could also be used to increase the sensitivity and/or bandwidth of an accelerometer employing electrical readout.

In one embodiment two V-beams are used. These deflect in opposing directions. This doubles the change in cavity length for a given mass displacement and thereby further enhancing the sensitivity of the device, by allowing measurement between two points of maximum deflection of the separated beams. In this embodiment, the fact that the separation between the two beams can be used conveniently mitigates effects such as transverse movement of the system leading to erroneous measurement, so the two beam system promotes heightened accuracy as well as heightened amplification. In this case the Fabry Perot cavity is formed between two reflective surfaces on the V-beams.

Although the description has focused on measuring accelerations in one direction, each face of the proof mass could be fixed with V-beams. The beams could also provide the restoring force for the proof mass if of appropriate elasticity.

The device has all the advantages of MEMS devices (including qualities such as being compact, manufacturable, precise). In addition, being optically addressed it has all the advantages of optical over electrical systems (including suitable for harsh environments, no electromagnetic interference, high bandwidth, no connecting conductors hence may be deployed in sensitive environment)

Amplification of the proof mass motion allows the resonant frequency, and hence the measurement bandwidth, of the accelerometer to be increased while retaining the same sensitivity. Alternatively, it, allows the sensitivity to be increased for a given bandwidth. Most generally, it allows the bandwidth-sensitivity product to be increased The device may be used in any circumstances where accelerometers are applied. Consequently there are a huge number of commercial opportunities. These could be for navigation and guidance systems, dynamics testing of materials and structures/systems. It is particularly suited to microsystems, for instance MEMS accelerometers for airbag deployment, inertial sensors, virtual reality/entertainment systems (eg Nintendo Wii™) and mobile telecommunications. It lends itself to miniaturisation and high performance where optical systems are favoured over electrical systems eg Harsh Environments (High EMI, explosives etc) or for high fidelity, high bandwidth applications.

The invention will now be described with reference to the following figures:

DETAILED DESCRIPTION

Figure 1:
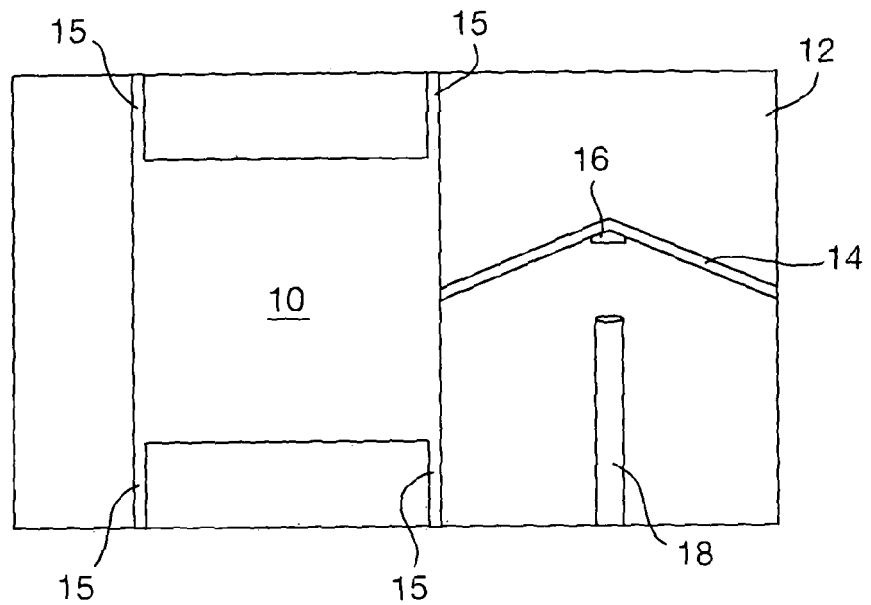
FIG. 1 shows a plan of an accelerometer according a first embodiment of the invention.

In FIG. 1, a proof mass (10) is etched into a silicon Block (12) so that it is able to move within a silicon cavity. This is achieved through photo-lithography and Reactive Ion Etching (RIE) and wet etching of silicon on insulator wafers to produce the cavity. A single V beam (14) is located between the proof mass (10) and the edge of the block (12) and is affixed to the wall of the block. The device is assembled using UV cured epoxy and active alignment techniques. The proof mass is in contact with the walls of the block through springs (15) which limit the motion to one direction and provide a restoring force.

The movement of the proof mass causes deflection of the V-beam, resulting in an amplified deflection at its centre in a direction orthogonal to the proof mass motion. A silicon mirror is mounted at the centre of the V-beam such that a Fabry-Perot cavity is formed between this mirror and a fixed mirror.

A thin Gold coating or other reflective layer (16) may alternatively be provided on the beam to act as a mirror, using sputter coating/evaporation of thin film coating technology. An optical analyser (18) can detect movement of the beam. The amplified motion is detected by means of interrogation by one or two optical fibres. The device may be fabricated in silicon using standard Micro-Electro-Mechanical-Systems (MEMS) processing.

Figure 2:
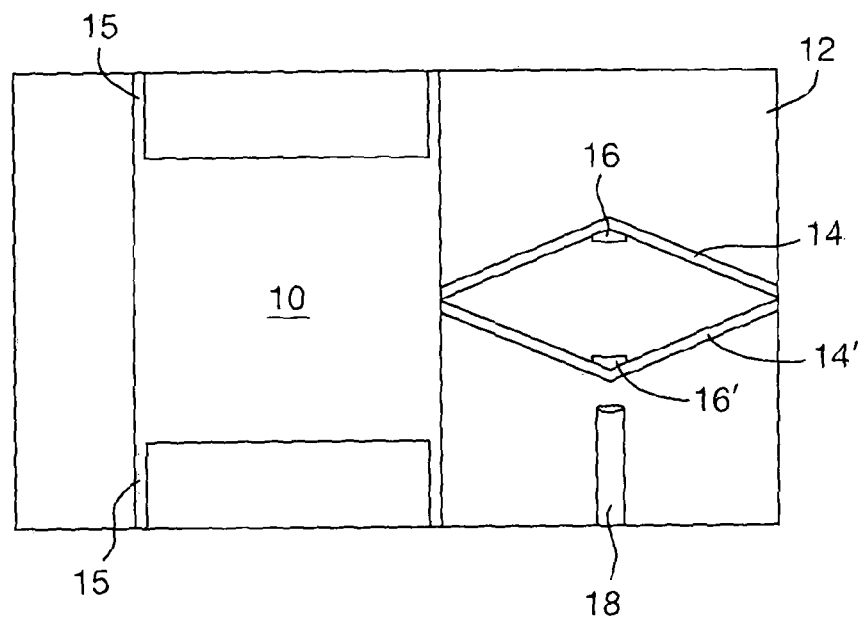
FIG. 2 shows a plan of an accelerometer according a second embodiment of the invention

In an second embodiment FIG. 2, two V-beams are used in such a way that the amplified motion in each is in opposing direction to that in the other. This enables a further ×2 amplification of the proof mass motion since the two beams deflect in opposing and equal directions. In this case the Fabry-Perot cavity is formed between mirrors (16, 16') mounted on the two V-beams (14,14').

Compared to the single V-beam design, the design with two V-beams provides better performance in terms of cross-axis, sensitivity because an applied acceleration along the same axis as the mirror motion should have the same effect on both V-beams, resulting in no change in the cavity length.

Figure 3:
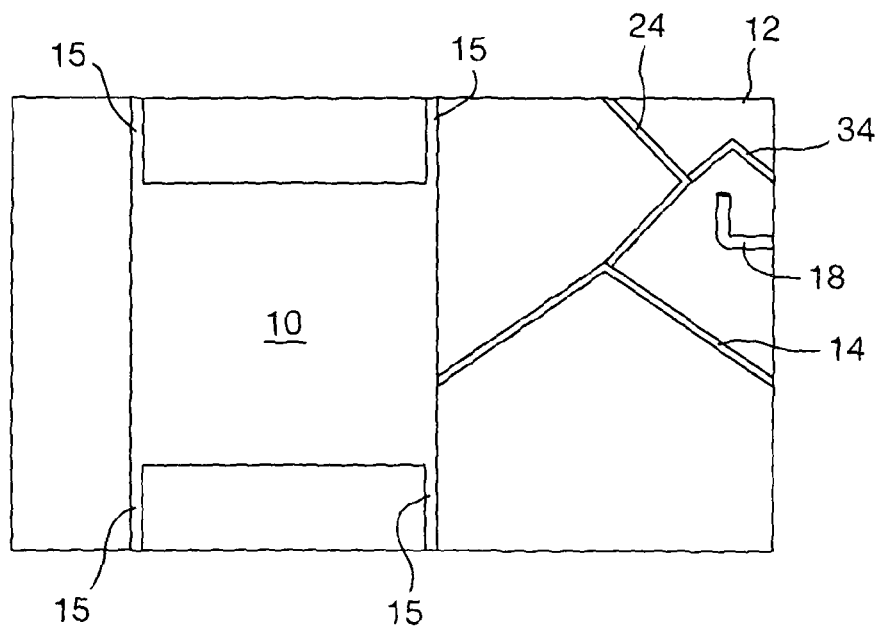
FIG. 3 shows a plan of an accelerometer according a third embodiment of the invention

In FIG. 3, a second V-beam (24) is attached to the middle of the first V-beam (14) and to the wall of the substrate. This gives a multiplicative amplification as when the first V-beam deflects the second reamplifies this deflection. A third V-beam (34) is attached to the middle of the second V-beam (24) and to the wall of the substrate, thus providing further multiplicative amplifications caused by the cumulative effect of the deflection of the first V-beam (14, the second V-beam (24) and the third V-beam (34). Indeed, it is possible to have a 'cascade' of V-beams (4) all located between a wall of the substrate and the apex of a previous V-beam. Although this adds complexities to the manufacture in both the interrogation and etching processes and may reduce robustness, in highly specialised applications, the engineering challenges required could be justified by the benefits gained.

In a further embodiment of this invention, the magnitude of the deflection of the V-beam or V-beams determines the magnitude of a force generated by an actuator that opposes the movement of the proof mass. The actuator may, for example, be an electrostatic actuator or a thermal actuator. This occurs within a closed loop mode of operation such that the deflections of the V-beam or V-beams continuously determine the magnitude of the force required to prevent the accelerometer from operating in a non-linear mode. The acceleration can thus additionally be ascertained by measuring the magnitude of the force applied by the actuator.

The invention claimed is:

1. An accelerometer comprising a proof mass within a fixed substrate wherein the proof mass is connected to the substrate by one or more V-beams, and acceleration is determined by measuring the deflection of the V-beam or beams, and in which the V-beam or beams comprises a section coated with a reflectivity enhancing layer.

2. An accelerometer as claimed in claim 1 in which the deflection of the V-beam or beams is measured at the point of maximum deflection of the V-beam or beams.

3. An accelerometer as claimed in claim 1 in which the deflection is measured by measuring variations in capacitance due to the deflection of the V-beam or beams.

4. An accelerometer as claimed in claim 1 in which the deflection is measured by optical means.

5. An accelerometer as claimed in claim 4 in which the optical means is a fibre optical cable and the end of the fibre optical cable and one V-beam form a Fabry-Perot cavity.

6. An accelerometer as claimed in claim 1 comprising two beams located on the same side of the proof mass wherein the two V-beams deflect in opposite directions to each other.

7. An accelerometer as claimed in claim 6 in which a Fabry-Perot cavity is formed between the two opposing V-beams.

8. An accelerometer as claimed in claim 1 in which the reflectivity enhancing layer comprises gold.

9. An accelerometer according to claim 1 in which a further V-beam depends from the V-beam and is connected to the substrate.

10. An accelerometer according to claim 1 in which the proof mass and substrate are formed out of Silicon.

11. An accelerometer according to claim 1 in which the deflection of the V-beam or V-beams determines the magnitude of a force opposing the movement of the proof mass that is generated by an actuator.

12. An accelerometer to claim 11 in which the actuator is an electrostatic actuator.

13. An accelerometer comprising a proof mass within a fixed substrate wherein the roof mass is connected to the substrate by one or more V-beams, and acceleration is determined by measuring the deflection of the V-beam or beams, and in which (a) the deflection of the V-beam or V-beams determines the magnitude of a force opposing the movement of the proof mass that is generated by an actuator and (b) the actuator is a thermal actuator.

* * * * *